(12) United States Patent
Lavezzi et al.

(10) Patent No.: US 8,061,234 B2
(45) Date of Patent: Nov. 22, 2011

(54) ADJUSTMENT DEVICE FOR MOTORCYCLE MASTER CYLINDERS

(76) Inventors: Roberto Lavezzi, Brembate di Sopra (IT); Ivan Maggioni, Brembate di Sopra (IT)

( * ) Notice: Subject to any disclaimer, the term of this patent is extended or adjusted under 35 U.S.C. 154(b) by 821 days.

(21) Appl. No.: 11/997,982

(22) PCT Filed: Aug. 30, 2005

(86) PCT No.: PCT/IT2005/000502
§ 371 (c)(1), (2), (4) Date: Mar. 7, 2008

(87) PCT Pub. No.: WO2007/026383
PCT Pub. Date: Mar. 8, 2007

(65) Prior Publication Data
US 2008/0202887 A1 Aug. 28, 2008

(51) Int. Cl.
*G05G 1/04* (2006.01)

(52) U.S. Cl. ......................................................... 74/522

(58) Field of Classification Search ................. 74/501.6, 74/502.2, 519, 522, 523, 525; 188/344
See application file for complete search history.

(56) References Cited

U.S. PATENT DOCUMENTS

| 4,560,049 A | 12/1985 | Uchibaba et al. |
| 4,840,082 A | 6/1989 | Terashima et al. |
| 4,917,423 A * | 4/1990 | Kohn ............................ 292/324 |
| 6,457,378 B2 * | 10/2002 | Hatakoshi et al. .............. 74/525 |
| 2006/0070483 A1 * | 4/2006 | Dimsey .......................... 74/525 |

FOREIGN PATENT DOCUMENTS

| EP | 0893337 | 1/1999 |
| WO | 2005/049416 | 6/2005 |

* cited by examiner

*Primary Examiner* — Thomas R Hannon
*Assistant Examiner* — Phillip A Johnson
(74) *Attorney, Agent, or Firm* — Shoemaker and Mattare

(57) ABSTRACT

An adjustable lever assembly for a motorcycle master cylinder includes a first element pivotally connected to the master cylinder, and a manually operable second element pivotally connected to the first element. An adjuster rotatably mounted on the second element can be turned to adjust the angular rest position between the first and second elements.

21 Claims, 8 Drawing Sheets

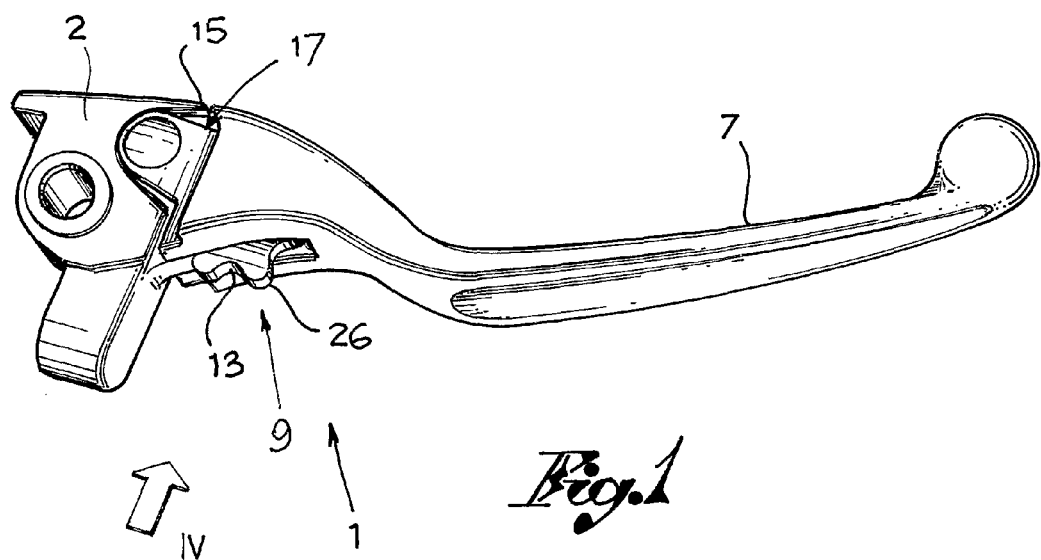
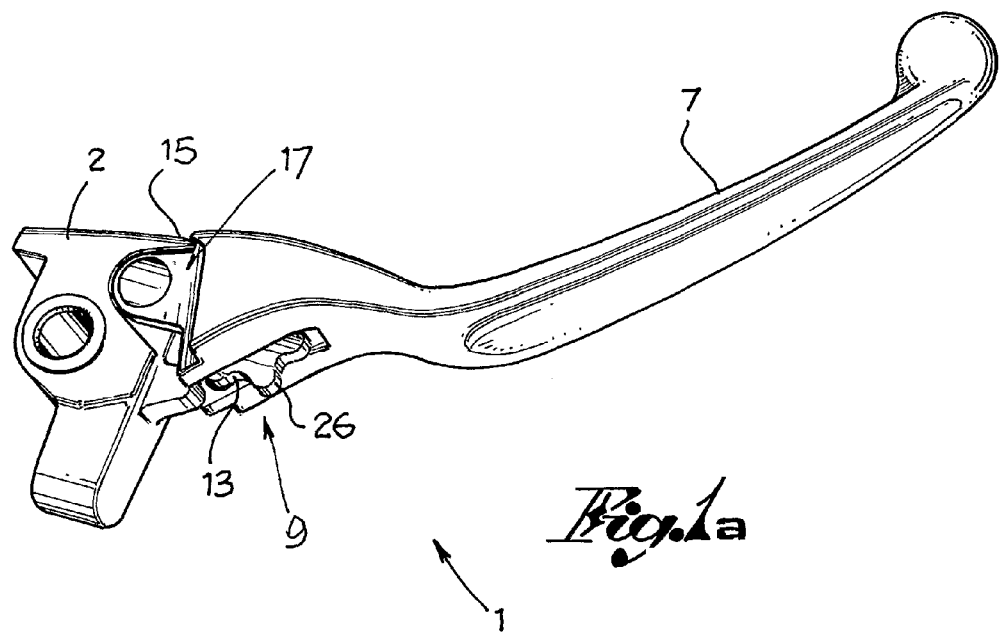

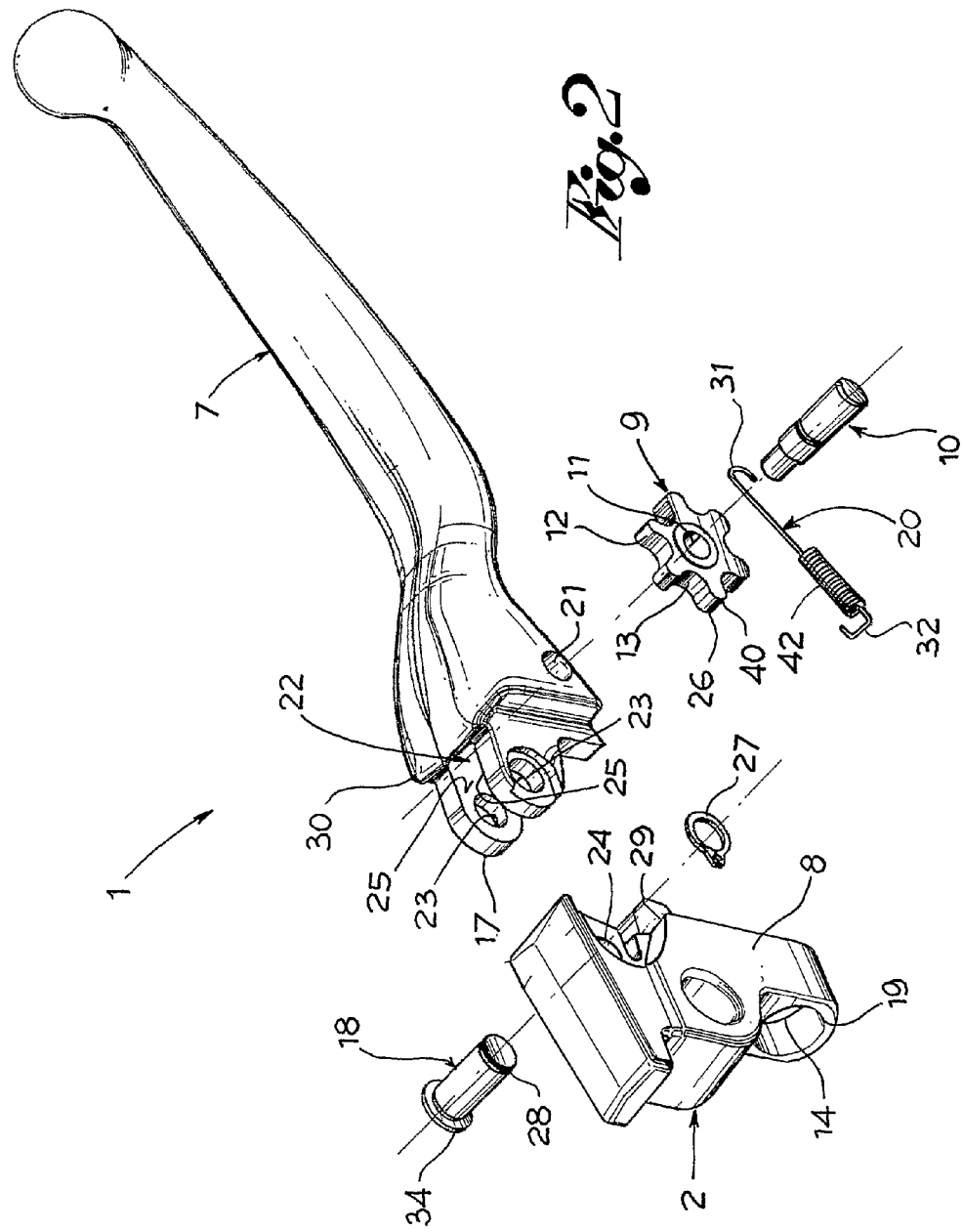

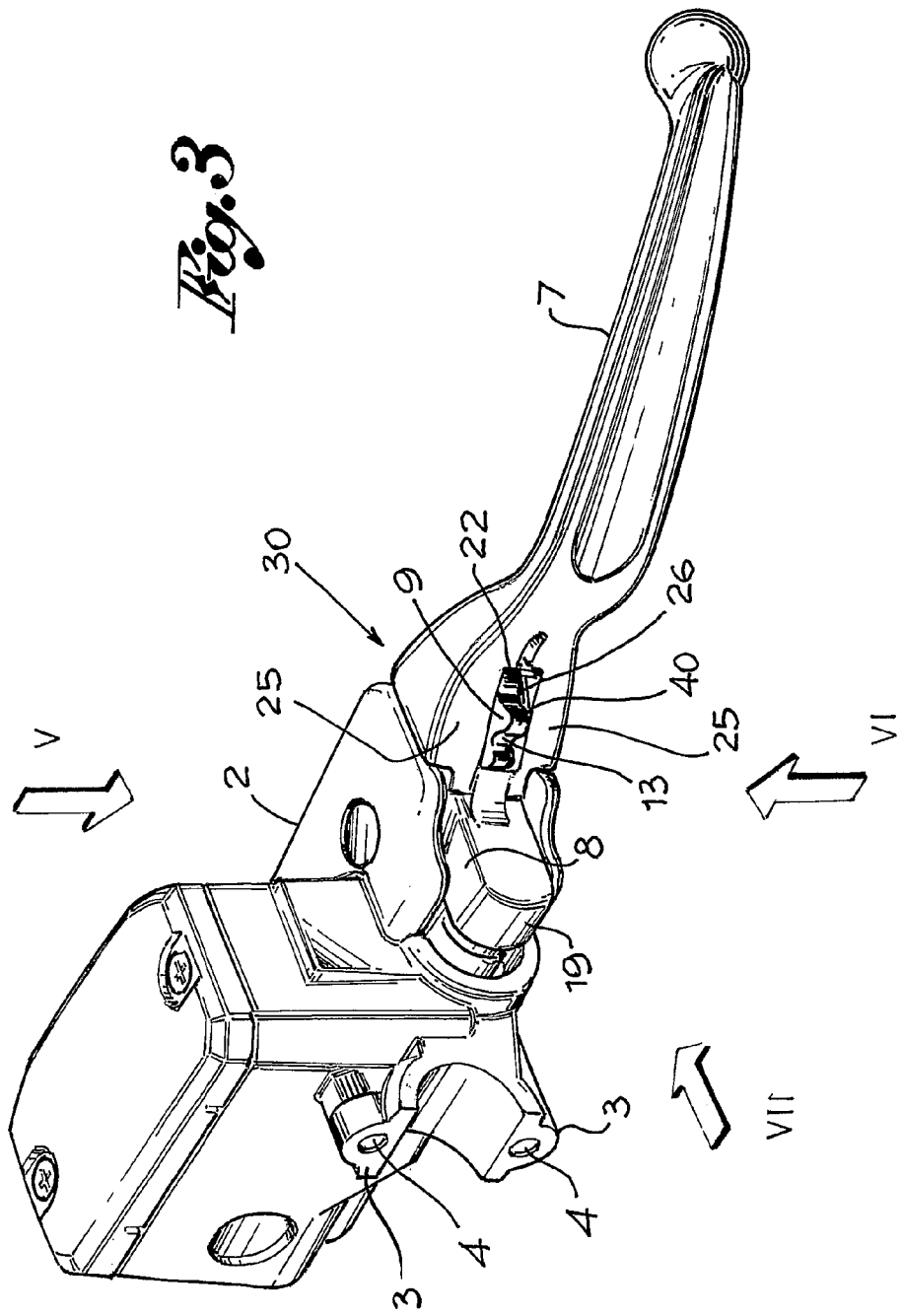

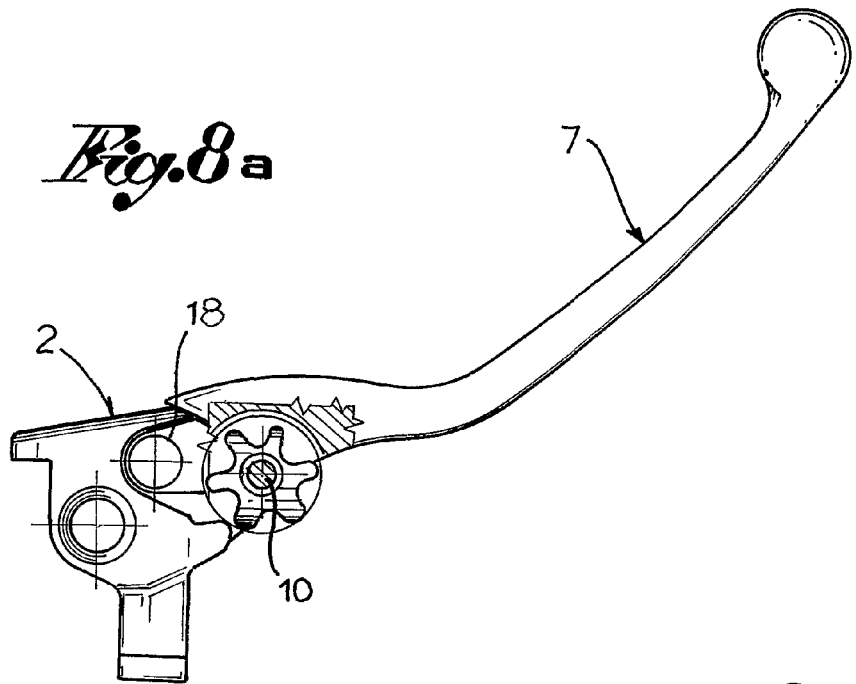
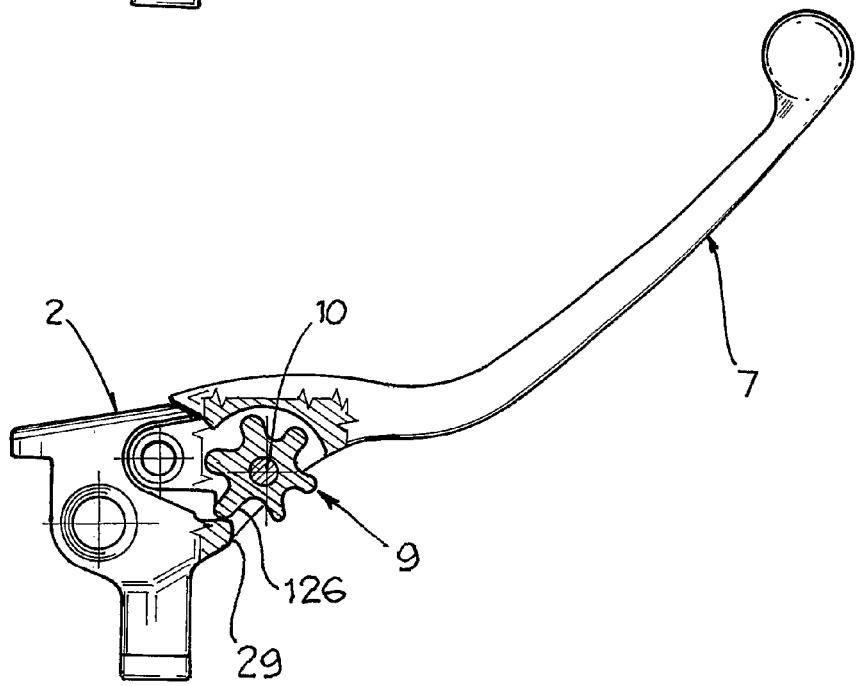

ADJUSTMENT DEVICE FOR MOTORCYCLE MASTER CYLINDERS

FIELD OF THE INVENTION

The present invention relates to an adjustment device for a lever device for vehicle control, in particular a lever device for motorcycles wherein the lever rest position is adjustable.

BACKGROUND OF THE INVENTION

In motorcycles, brake and clutch are manually actuated by a pump ("master cylinder") actuated by a lever device mounted on the handlebar of the motorcycle itself, from which a hydraulic pipe extends to the system to be controlled, for example a brake.

The lever of the lever device is usually arranged along the handlebar grip and the motorcyclist, in order to actuate the lever itself, grips the handlebar along with the lever and closes his/her hand tight so as to turn the lever towards the grip itself. The lever movement produces a thrust that acts on a hydraulic piston, whose stroke or position determines the fluid pressure in said hydraulic pipe to control the brake or the clutch.

Since the various handlebars of motorcycles exhibit different shapes and also the motorcyclists' hands do not all have the same size, the need of being able to adjust the lever rest position relative to the handlebar grip is felt.

Several solutions for carrying out an adjustment of the lever position have been proposed. A group of these solutions provides for an adjustment device of the lever position, such as in U.S. Pat. No. 4,840,082.

This known device is provided with a lever that can rotate about a support shaft for pushing a stem that influences a piston for putting the brake fluid under pressure during the braking action.

The stem selectively couples with at least one seat of different depth of a rotating adjustment block, for varying the operating lever position relative to the handlebar.

Moreover, the lever can be rotated about a coupling shaft against the strength of a spring ("double fulcrum"), for releasing the stem from one of the seats and thus allowing the rotation of the rotating adjustment block by a gripping portion or knob obtained at an end of the rotating block and that raises transversally from the operating lever, or by a screwdriver that acts on a screw at the end of the block itself.

The stem thus slides on guiding grooves, until it couples with the desired seat; in this way, the relative position between lever and handlebar is adjusted.

However, this known device exhibits excessive overall dimensions in the cross direction relative to the adjustment lever, that is, axial to the rotating adjustment block.

SUMMARY OF THE INVENTION

The object of the present invention therefore is to provide an adjustment device for motorcycle master cylinders having such features as to obviate the disadvantages mentioned with reference to the prior art and wherein its assembly and maintenance should be facilitated.

This an other objects are achieved by an adjustment device for motorcycle master cylinders as described below.

BRIEF DESCRIPTION OF THE DRAWINGS

The features and advantages of the device according to the present invention will appear more clearly from the following description, made by way of an indicative and non-limiting example with reference to the annexed figures, wherein:

FIG. 1 shows a perspective view of an adjustment device for motorcycles pumps;

FIG. 1a shows a perspective view of the device of FIG. 1 in open position;

FIG. 2 shows a perspective exploded view of the device of FIG. 1;

FIG. 3 shows a further perspective view of the device of FIG. 1 associated to a motorcycle pump;

FIG. 8a shows a partial section view of the device of FIG. 1, in open position;

FIG. 8b shows a partial section view of an alternative embodiment of the device of FIG. 1, in open position;

DETAILED DESCRIPTION OF THE INVENTION

Figure 4:
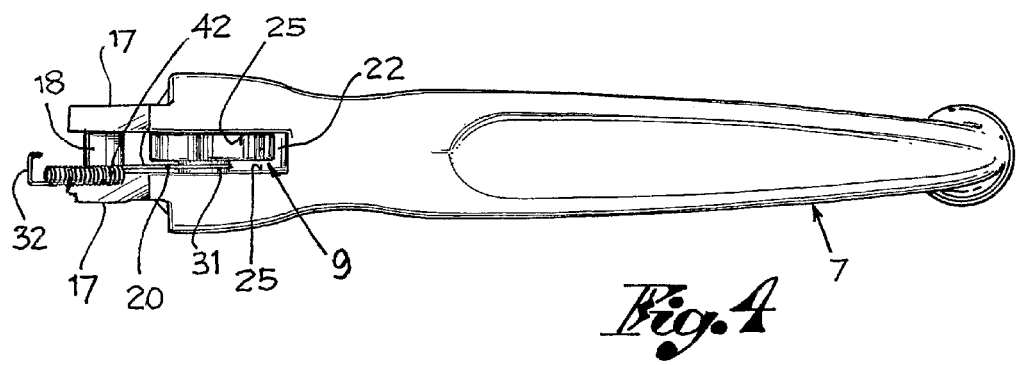
FIG. 4 shows a view of the device of FIG. 3 in the direction of arrow VI of FIG. 1.
Figure 6:
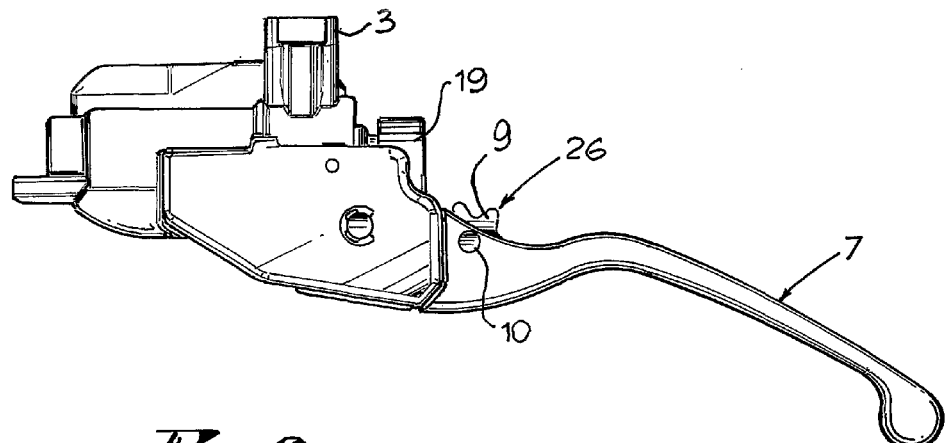
FIG. 6 shows a view of the device of FIG. 3 in the direction of arrow VI of FIG. 3.

In accordance with the present invention, and with reference to the annexed figures, reference numeral 1 indicates an adjustment device of lever devices for controlling a cylinder-piston unit for vehicles, in particular for adjusting a lever device for motorcycles wherein the lever rest position is adjustable, associable by tightening portions 3 to a handlebar 35 of a motorcycle. There are provided means for connecting device 1 to handlebar 35, for example comprising tightening portions 3 provided with special holes 4 optionally threaded for seating tightening screws (FIG. 3).

According to the present invention, said device 1 comprises first operating means 2, such as a thrust lever 2, turnably associable to the cylinder-piston unit so as to impart an actuation movement to said cylinder-piston unit.

The thrust lever 2 is therefore associated to the cylinder-piston unit, for example in a cylindrical seat 5 which slidingly houses a piston.

Figure 5A:
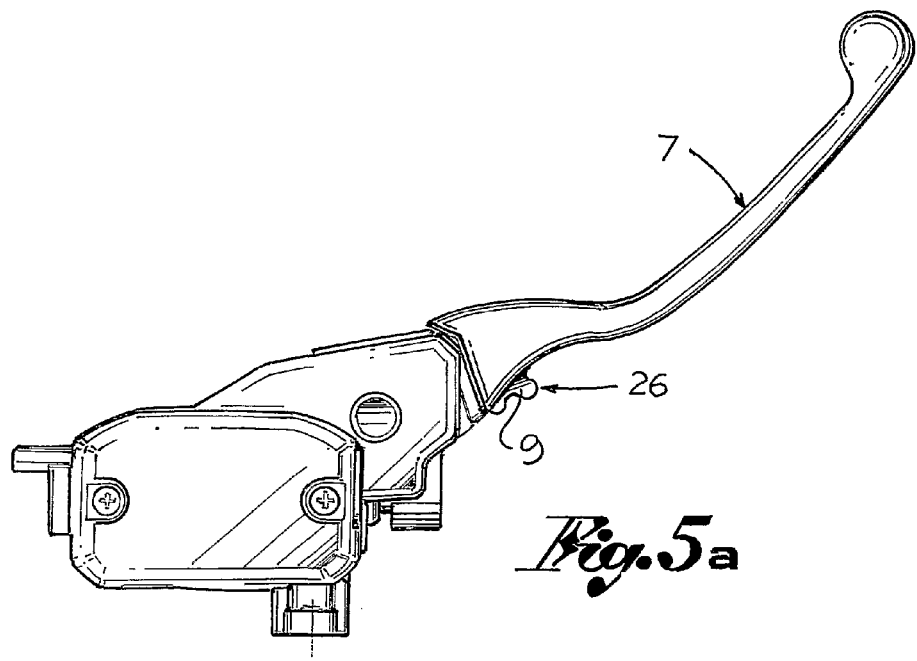
FIG. 5a shows a view of the device of FIG. 5 in open position.
Figure 5:
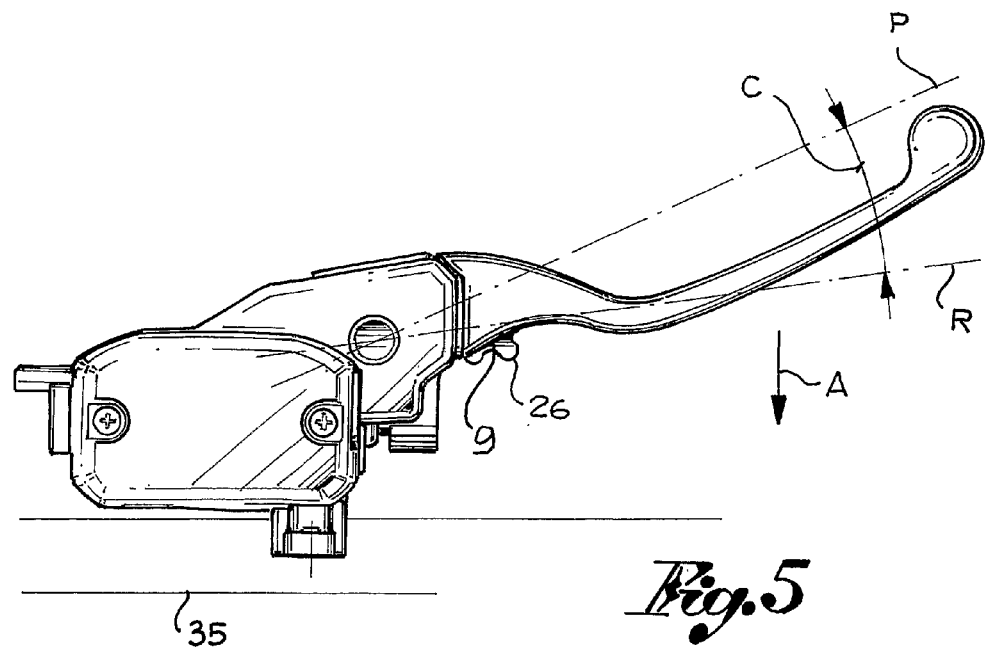
FIG. 5 shows a view of the device of FIG. 3 in the direction of arrow VI of FIG. 3.

Moreover device 1 comprises second operating means 7, or gripping lever 7, turnably connected to the thrust lever 2 and suitable for imparting, by a portion thereof, a thrust on said thrust lever 2, which causes the transmission of the actuation movement to said cylinder-piston unit, along an angular actuation stroke A (FIG. 5).

The gripping lever 7 is made turnable relative to the thrust lever 2 by pivoting on a pin 18, as illustrated hereinafter in detail.

Figure 8:
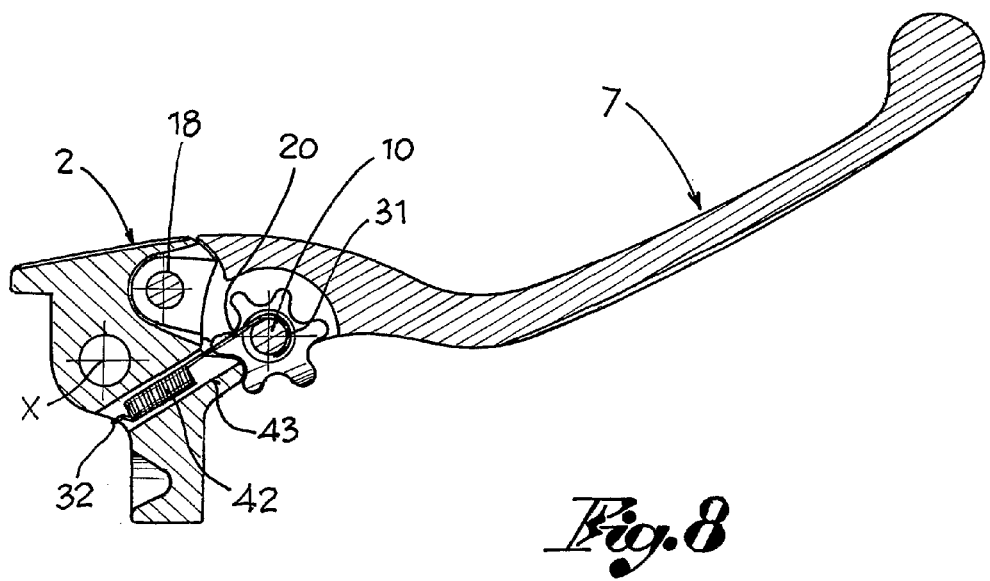
FIG. 8 shows a section view of the device of FIG. 1.

The thrust lever 2 is in turn made turnable by pivoting on a pin, arranged along an axis of rotation X (FIG. 8, 9).

The gripping lever 7 preferably comprises a gripping portion for manually operating on the lever itself (FIG. 5).

In particular, therefore, the adjustment device 1 is suitable for adjusting the angular position, that is, the distance between the gripping lever 7, for example the brake lever and handlebar 35, that is, the grip of handlebar 35, at will so as to adapt to the driving conditions desired by a user.

Preferably, the thrust lever 2 comprises a transmission portion 8, carrying an eyebolt 19, which imparts the actuation movement, by a push rod arranged between the thrust lever 2 and the piston, to the cylinder-piston unit, for actuating the cylinder-piston unit itself (FIGS. 3 and 5).

The transmission portion 8 and eyebolt 19 preferably protrude from the thrust lever 2 and are arranged on the same plane as the thrust lever 2 (FIGS. 1, 2 and 3).

According to a preferred embodiment, in fact, eyebolt 19 is a seat or "glass" shaped recess and exhibits a bottom 14 which, in the standard use, abuts against the push rod, for actuating the piston.

Thus, when the gripping lever 7 is placed in rotation along the angular actuation stroke A, it imposes the rotation in the same direction to the thrust lever 2 too, and consequently the transmission portion 8 pushes with bottom 14 of eyebolt 19 against push rod; in this way, movement is imparted from the gripping lever 7, along the angular actuation stroke A, to the thrust lever 2 and hence to the cylinder-piston unit, in particular to the piston.

In accordance with the present invention, device 1 comprises adjustment means 9 arranged between said thrust lever 2 and said gripping lever 7, for adjusting the relative position between said thrust lever 2 and gripping lever 7, that is, for adjusting the distance between said gripping lever 7 and the grip of handlebar 35 of the motorcycle.

The adjustment means 9 are arranged between the gripping lever 7 and the thrust lever 2 and are turnably connected to an end of the gripping lever 7 by a first pin 10, as explained in detail hereinafter.

In accordance with the present invention, the adjustment means 9 carry coupling means 13 or coupling seats 13 and operating portions 26.

Moreover, according to the present invention, each coupling means 13 is arranged between or comprised between, two corresponding operating portions 26.

In fact, the coupling means 13 substantially are grooves, or depressions, or coupling seats defined by the operating portions 26.

The operating portions 26 comprise thrust surfaces accessible by an operator and/or a user of the motorcycle, for allowing a rotation of the adjustment means 9 about the first pin 10.

In fact, in accordance with the present invention, the adjustment means 9 are provided with a rotation hole 11, suitable for housing the first pin 10.

Moreover, said thrust lever 2 comprises coupling counter-means 29, suitable for coupling with said coupling means 13, for cooperating with the coupling means 13 themselves, and allowing the desired adjusted position to be kept.

In fact, the coupling means 13 selectively couple with the coupling counter-means 29, for defining at least one angular rest position R of said gripping lever 7 relative to handlebar 35, that is, between the thrust lever 2 and the gripping lever 7 (FIG. 5).

By rest position R it is meant a position of the gripping lever 7 wherein the coupling counter-means 29 couple with said coupling means 13, but the transmission portion 8 does not substantially impart a pressure on the brake fluid through the piston.

In other words, the gripping lever 7 can be operated along the angular actuation stroke A, which extends from the angular rest position R of the gripping lever in a first direction of rotation.

In fact, along the angular actuation stroke A, the thrust lever 2 and the gripping lever 7 are integrally coupled, that is, along the angular actuation stroke A they cover in their movement the same angular width, thanks to the fact that the coupling counter-means 29 are constantly in abutment in a desired coupling seat 13 of the adjustment means 9.

Moreover, the gripping lever 7 can also be turned along an angular adjustment stroke C which extends from said angular rest position R in a second direction of rotation, opposed to the first direction of rotation (FIG. 5); during the angular adjustment stroke C, the adjustment means 9 are uncoupled from the coupling counter-means 29 and an "open" adjustment position P of the gripping lever 7 is reached, opposed to the rest position R, along the angular adjustment stroke C.

When the adjustment means 9 are uncoupled from the coupling counter-means 29, that is, for example, in the adjustment position P of the gripping lever 7, it is possible to rotate the adjustment means 9 themselves for adjusting the position of the gripping lever 7, as illustrated hereinafter in the description.

Thus, in other words, the rest position R is an "interface" position, that is, an intermediate or neutral position, between the angular actuation stroke A and the angular adjustment stroke C, wherein the gripping lever 7 is held in abutment by special elastic means 20, 120 on the thrust lever 2 and at the same time, the coupling means 13 are coupled with the coupling counter-means 29.

In yet other words, in the rest position R no thrust is imparted on the cylinder of the associated hydraulic system, and therefore the fluid contained therein is not put under pressure, that is, for example, no braking action is exerted and at the same time, the coupling means 13 are coupled with the coupling counter-means 29.

Preferably, the coupling counter means 29 are shaped as a parallelepiped portion with at least partly curvilinear section.

The coupling counter-means 29 are preferably integrally formed on the thrust lever 2 and hence protruding towards the gripping lever 7, shaped as a protuberance or operating pin, suitable for coupling into one of the coupling means 13.

In this way, by the coupling counter-means 29 coupled to the coupling means 13 of the adjustment means 9, the gripping lever 7 and the thrust lever 2 are made integral during the angular actuation stroke A.

In fact, the adjustment means 9, as said, are turnably associated to the gripping lever 7; to this end there are provided side surfaces 25 or walls, protruding from a first end 30 of the gripping lever 7, which house and axially delimit the adjustment means 9 (FIG. 4).

The side surfaces 25, in fact, delimit a seat 22 obtained along the direction of development of the gripping lever 7, that is, recessed between the two side surfaces 25.

According to the present invention, seat 22 houses the adjustment means 9.

According to the present invention, moreover, the side surfaces 25 are arranged substantially parallel to one another and define two tines 17 which further protrude towards the thrust lever 2.

Preferably, tines 17 are obtained by comprising a rectilinear portion and a rounded or curvilinear end, for better rotation of the gripping lever 7 when it is connected to the thrust lever 2.

Tines 17 turnably house a second rotation pin 18, for obtaining the coupling with the thrust lever 2, as illustrated hereinafter.

Favourably, the second pin 18 is arranged transversally relative to the gripping lever 7 and to the thrust lever 2 and is parallel to the first pin 10.

Moreover, seat 22 is laterally open towards the thrust lever 2, so that the adjustment means 9 exhibit, or face, the coupling means 13 thereof towards the thrust lever 2 and the coupling counter-means 29.

According to the present invention, the adjustment means 9 are housed into seat 22, in a turnable manner by the first pin 10, so as to adjust the position thereof and thus adjust the distance between the gripping lever 7 and handlebar 35.

Thus, the first pin 10 turnably supports the adjustment means 9 into seat 22.

According to the present invention, moreover, the adjustment means 9 are fully housed into seat 22 transversally to the gripping lever 7, that is, between the side surfaces 25.

Figure 7:
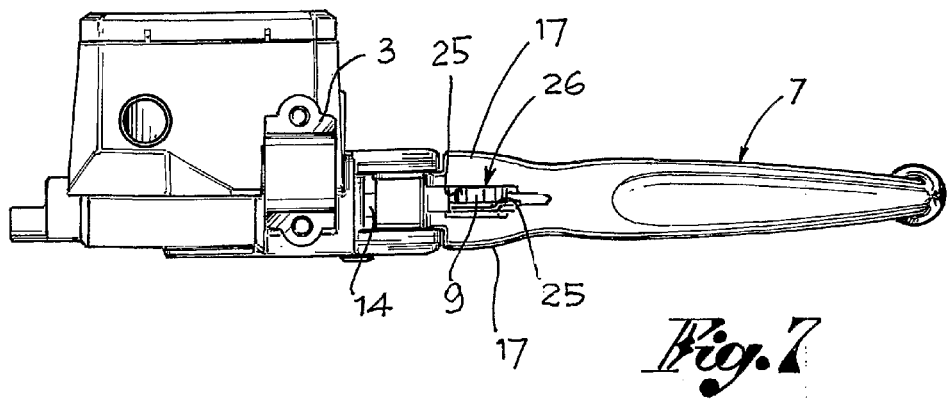
FIG. 7 shows a view of the device of FIG. 3 in the direction of arrow VII of FIG. 3.

In fact, the adjustment means 9, even though they are fully housed between the side surfaces 25, protrude along the radial direction thereof outside of the gripping lever 7, as can be seen in FIGS. 1, 3 and 7.

In fact, the adjustment means 9 substantially are a cylindrical structure, centrally hollow for housing the first pin 10, and having an outer side surface 12, or skirt 12, wherein there are obtained radially recessed regions, that is, seats, which define the coupling means 13, and operating tips, as illustrated in detail hereinafter.

In accordance with the present invention, the rotation of the adjustment means 9 is suitable for selecting the coupling between one of the selectable coupling means 13 and the coupling counter-means 29, that is, for allowing the coupling between the coupling counter-means 29 and a desired one of the coupling means 13.

The possibility of providing for different possible coupling configurations between the adjustment means 9 and the coupling counter-means 29 allows adjusting the position of the gripping lever 7 relative to the thrust lever 2 and thus relative to handlebar 35.

Thus, along the axial direction of the cylinder of the adjustment means 9, the adjustment means 9 themselves are fully comprised within the seat 22 defined by walls substantially parallel to each other, that is, they are comprised between the planes defined by the side surfaces 25 themselves, whereas along the axial direction, the same adjustment means 9 externally protrude at least partly from the gripping lever 7.

In accordance with the present invention, as said, the adjustment means 9 exhibit the side skirt 12, which in turn comprises the coupling means 13 and the operating portions 26.

In fact, according to a preferred embodiment of the present invention, the adjustment means 9 are shaped as a rotating cam 9.

On the side surface thereof, the rotating cam 9 is provided with the coupling means 13, shaped as grooves or coupling seats 13.

The rotating cam 9 is provided with at least one coupling seat 13, which allows the gripping lever 7 to be arranged in at least one rest position R.

Preferably, according to the number of coupling seats 13, it is possible to position the gripping lever at will in a corresponding rest position R; in other words, it is possible to choose from a plurality of available rest positions.

Preferably, the rotating cam 9 exhibits a plurality of coupling seats 13, for allowing selectively arranging the gripping lever 7 in a desired one of the different rest positions, that is, different relative angular positions between the gripping lever 7 and the thrust lever 2 and thus handlebar 35.

The coupling seats 13 have such profile as to allow a geometrical coupling complementary with the coupling counter-means 29, for example a profile with a curvilinear pattern complementary to the curvilinear pattern of the coupling counter-means 29 themselves, so as to prevent undesired or accidental uncoupling of the adjustment means 9.

According to the present invention, therefore, the operating portions 26 of the adjustment means 9 are teeth or operating tips 26 that extend substantially radially; the operating tips 26 are laterally sided to the coupling seats 13 and are arranged alternating relative to the coupling seats 13 themselves.

According to the present invention, the operating portions 26, two by two, define each of said coupling means 13.

In other words, the side skirt 12 is a continuous surface comprising the operating tips 26, spaced with the coupling seats 13.

In other words, the adjustment means 9 comprise the coupling seats 13 and the operating tips 26, each of said coupling seats 13 being comprised between two respective operating tips 26.

According to the present invention, the coupling seats 13 are obtained at different depths relative to the axis of rotation of said rotating cam 9, that is, at a different radial distance from pin 10, for allowing the angular positioning variable at the user's will between the gripping lever 7 and the thrust lever 2.

Seen in section, therefore, the rotating cam 9 exhibits a shape, that is, an outer perimeter, substantially as an irregular dial, wherein the coupling seats 13 extend towards the centre of the cam at different depths, that is, each coupling seat 13, relative to the adjacent seats, is arranged at a different distance from the axis of rotation of the rotating cam 9 itself.

In other words, the rotation hole 11 is arranged in the rotating cam 9 so that the circular profiles defined by the radial distances of the coupling seats 13 from hole 11 form a series of circumferences having the same centre in hole 11, but having a different radius.

According to the present invention, each coupling seat 13 geometrically and selectively couples with the coupling counter-means 29, or operating pin of the thrust lever 2, for changing the distance between the gripping lever 7 and handlebar 35 at will.

In fact, according to the depth of the coupling seat 13, the coupling counter-means 29 penetrate in the coupling seat 13 of the rotating cam 9 selected by the operator, more or less deeply, thus allowing a more or less wide apart position of the gripping lever 7 relative to handlebar 35, that is, relative to the thrust lever 2.

Moreover, the operating portions 26 or operating tips 26, by their structure, define and delimit the coupling seats 13, thus contributing to the geometrical coupling, that is, forming the side abutment surfaces of the coupling seats 13 themselves, which interfere with the coupling counter-means 29 and prevent accidental uncoupling.

At the same time, the operating portions 26 are surfaces suitable for receiving a twisting torque, from example from the motorcyclist's fingers, which puts the rotating cam 9 in rotation about the first pin 10, for selecting the desired coupling seat 13 and selectively defining the distance between the gripping lever 7 and handlebar 35.

According to the present invention, therefore, each operating portion 26, which receives the twisting torque for adjusting the position of the gripping lever 7, is integrally comprised between the coupling seats 13 and structurally defines the coupling seats 13 themselves, that is, it is at the same time a surface suitable for receiving an operating action of the operator and a surface which produces the geometrical coupling with the coupling counter-means 29 and thus also produces the coupling and the abutment of the coupling counter-means 29 in the selected coupling seat 13 of the rotating cam 9 itself.

In this way, since the rotating cam 9 is integral with the gripping lever 7, when the gripping lever 7 is in rest position R and the coupling counter-means 29 are in abutment in one of the coupling seats 13 of the rotating cam 9, the gripping lever 7 itself is in a corresponding angular position predetermined by the depth of the coupling seat 13 itself; in fact, the deeper the seat, the deeper the insertion of the coupling counter-means 29 into the seat itself, and vice versa, this allowing the gripping lever 7 to be more or less "closed" towards handlebar 35.

According to the present invention, the first end 30 of the gripping lever 7 is provided with a first hole 21, suitable for housing the first pin 10 and for cooperating therewith for turnably holding the rotating cam 9 into seat 22.

In fact, the rotating cam 9 is inserted into seat 22 so that the rotation hole 11 and the first hole 21 are axially aligned and after that, the rotating cam 9 is locked into seat 22 itself by the first pin 10 inserted in the first hole 21 and in hole 11 of the cam itself.

Moreover, the thrust lever 2 and the gripping lever are assembled and turnably coupled by the second rotation pin 18.

In other words, as said, the second pin 18 allows the turnable coupling between the thrust lever 2 and the gripping lever 7.

According to the present invention, moreover, each of tines 17 exhibits second coupling holes 23 that cooperate with the second pin 18 for connecting the two levers.

Correspondingly, the thrust lever 2 exhibits coupling holes 24, for allowing the turnable coupling between the thrust lever 2 itself and the gripping lever 7 by the second pin 18 inserted in the second holes 23 and in the coupling holes 24.

Holes 24 are suitable for being axially aligned within said second holes 23 and allowing the insertion of the second pin 18.

Tines 17 thus are inserted into a provided recessed region 36 or recessing portion of the thrust lever 2, shaped conforming, that is, complementary to tines 17, that is, with a curvilinear portion, for allowing the rotation thereof without hindrances.

The second pin 18 exhibits at a first end a holding head 34, of radial dimensions suitable for allowing the abutment of the holding head against the outer surface of one of tines 17, and preventing the release of the second pin 18.

Device 1 further comprises stopping means 27 arranged opposite the holding head 34; the stopping means 27 are suitable for axially constraining the second pin 18 when it is inserted into the second holes 23 and in holes 24, that is, when the gripping lever 7 and the thrust lever 2 are turnably associated.

Preferably, the stopping means 27 comprise a snap ring suitable for cooperating with an annular grove 28 obtained at a second end of the second pin 18.

Thus, the holding head 34 and the stopping means 27 lock the second pin 18 into holes 23 and into holes 24, actually preventing the disconnection of the gripping lever 7 from the thrust lever 2.

As said, according to the present invention the gripping lever 7 is actuable along an angular adjustment stroke C, opposite said angular actuation stroke A.

The angular stroke C is obtained by a rotation about the second pin 18, for obtaining a release of the selected coupling means 13 from the coupling counter-means 29.

By turning the gripping lever along the adjustment stroke C, the rotating cam 9 disengages from the coupling counter-means 29.

At this point, it is possible to rotate the rotating cam 9 itself about the first pin 10 so as to select the desired coupling seat 13, and thus the desired depth of the coupling seat 13 itself.

In accordance with a preferred embodiment, the rotating cam 9 exhibits an operating tip 126 protruding from the body of the rotating cam 9 by such extension as to produce a mechanical stop action on the rotation of the rotating cam 9 itself (FIG. 8b).

The operating tip 126 is suitably arranged between the minimum depth coupling seat 13 and the maximum depth coupling seat 13.

In fact, the operating tip 126 has such length as to interfere with the coupling counter-means 29; in this way it is possible to avoid the case where, by rotating the rotating cam 9, a maximum depth coupling seat 13 (corresponding to a minimum adjustment of the angular actuation stroke A) changes into an adjacent minimum depth coupling seat 13 (corresponding to a maximum adjustment of the angular actuation stroke A), or vice versa.

Thus, by providing the operating tip 126, it is possible to avoid sudden changes from a minimum adjustment extreme to a maximum adjustment extreme.

For example, therefore, when the maximum depth coupling seat 13 is selected, a further rotation in counterclockwise direction (see FIG. 8b) is prevented; in this case, to select the desired minimum depth coupling seat 13, it will be necessary to rotate the rotating cam 9 in clockwise direction until the position of the minimum depth coupling seat 13 coincides with the position of the coupling counter-means 29.

The selection of the desired coupling seat 13 precedes the step where the gripping lever 7 itself is returned along the angular adjustment stroke C, that is, towards handlebar 35, in rest position R and thus carries out the coupling of the coupling seat 13 itself to the coupling counter-means 29.

The return of the gripping lever 7 is obtained by special elastic means 20, 120, as illustrated in detail hereinafter.

Once such coupling has been carried out, the new rest position R of the gripping lever 7 selected by the user is obtained.

Thus, at least one portion of the rotating cam 9 is directly accessible and can be influenced from the outside for adjustment, for example by the motorcyclist's fingers.

In other words, at least one portion of the rotating cam 9 is visible from the outside, thus allowing quick access for adjusting the position of the lever relative to handlebar 35.

The cam portion directly accessible by the user, for the rotation thereof and the lever adjustment, as said above, protrudes laterally rather than transversally from the gripping lever 7, relative to the development direction of the gripping lever 7 itself.

Moreover, the protruding cam portion also exhibits surfaces comprising the coupling means 13, that is, the seats, and the operating portions 26.

In other words, when a coupling seat 13 of the cam engages in the coupling counter-means 29, that is, when the gripping lever 7 is in rest position R or actuated along the angular actuation stroke A, at least one of the remaining coupling seats 13 of the rotating cam 9 laterally protrudes from the gripping lever 7, that is, outside substantially towards handlebar 35, along for example with the two operating tips 26 that laterally define and delimit it.

In fact, device 1 exhibits the gripping lever 7, the thrust lever 2 and the rotating cam arranged between the two levers, laterally protruding from the gripping lever towards handlebar 35 rather than transversally from the gripping lever 7, in a region, or recess, of the system comprised of the gripping lever 7, the thrust lever 2 and the cylinder-piston unit, which is particularly protected.

In other words, the adjustment means 9, that is, the cam, are arranged between the gripping lever 7 and the coupling counter-means 29 of the thrust lever 2 as if they were arranged between "anvil and hammer", where "anvil" means the thrust lever 2 and in particular, the coupling counter-means 29 whereas "hammer" means the gripping lever 7.

According to the present invention, moreover, device 1 comprises elastic contrast means 20, 120 housed into seat 22 (FIGS. 8, 9) suitable for elastically and constantly influencing the second operating means 7 for allowing a return, that is, for carrying out the return of the gripping lever 7 to the angular rest position R.

Figure 10:
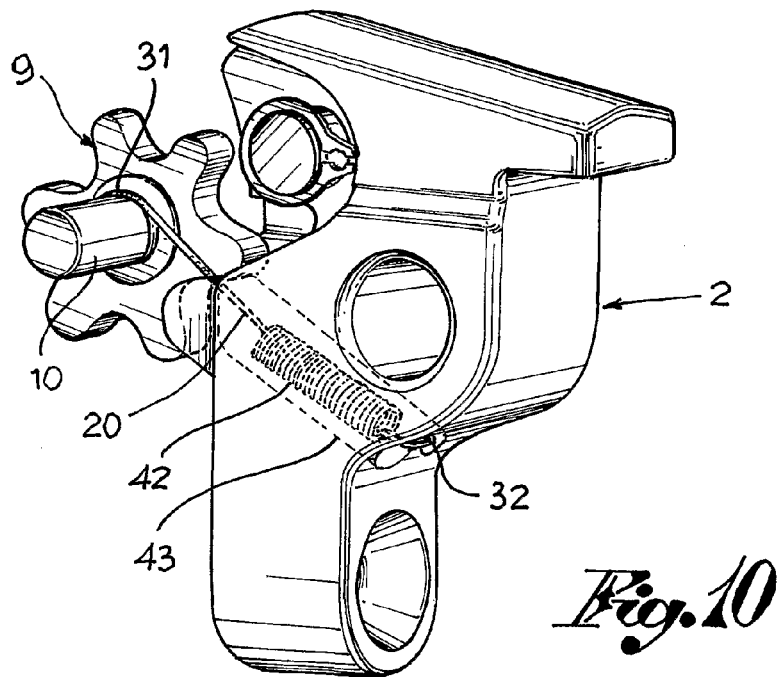
FIG. 10 shows an enlarged and partly in transparency view of a detail of the device of FIG. 1.
Figure 11:
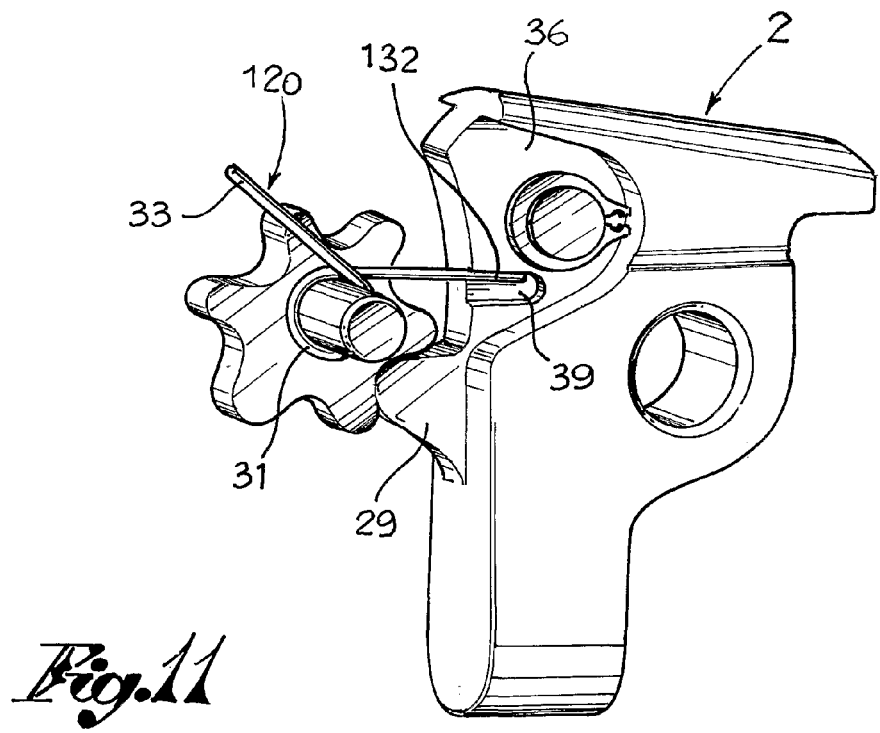
FIG. 11 shows an enlarged view of a portion of the device of FIG. 9.

The elastic means 20, 120 are preferably axially associated to the rotating cam 9 by coupling to the first pin 10 (FIGS. 10, 11).

In other words, the rotating cam 9 and the elastic means 20, 120 are associated to one another in seat 22 and afterwards fixed to the gripping lever 7 by the first pin 10 and to the thrust lever 2 as described hereinafter.

When the gripping lever 7 is actuated along the angular adjustment stroke C, the elastic means 20, 120 are suitable for constantly stressing the gripping lever 7 to return to the rest position R.

Thus, by the elastic means 20, 120 it is allowed the return, that is, the recall to the selected angular rest position R, after the gripping lever 7 has been rotated for releasing the rotating cam 9 from the coupling counter-means 29.

In other words, the elastic means 20, 120 are suitable for allowing the return to the selected angular hole position R when the gripping lever 7 is actuated along the angular adjustment stroke C, for releasing the rotating cam 9 and adjusting the position of the gripping lever 7.

Preferably, the elastic means 20, 120 exhibit a portion 31, at least partly annular, wherein the first pin 10 inserts, that is, suitable for axially engaging with the first pin 10.

Portion 31 for example is circular or hook-shaped, or curved.

Moreover, the elastic means 20, 120 exhibit a first end 32, 132 suitable for interfering with the thrust lever 2.

According to a preferred embodiment, the elastic means 20 comprise a traction spring 20 which exhibits a substantially cylindrical spring body 42 and comprising the first end 32, for coupling with the thrust lever 2 (FIGS. 8 and 10).

Preferably, the thrust lever 2 exhibits a special cylindrical housing 43, suitable for housing the spring body 42 of the traction spring 20 therein.

Preferably, housing 43 is a through hole obtained in the thrust lever 2, for allowing the assembly of the elastic means 20.

Alternatively, housing 43 is a cylindrical seat.

Housing 43 of the thrust lever 2 is provided with a suitable hooking portion, for coupling the first end 32 to the thrust lever 2 itself.

The traction spring 20 therefore couples with the first pin 10 by portion 31 and with the thrust lever 2 by the first end 32; in this way, when the gripping lever 7 is rotated along the angular adjustment stroke C, the traction spring 20 tends to extend, elastically deforming and thus to recover its non-deformed shape and therefore return the gripping lever 7 itself to the rest position R.

Figure 9:
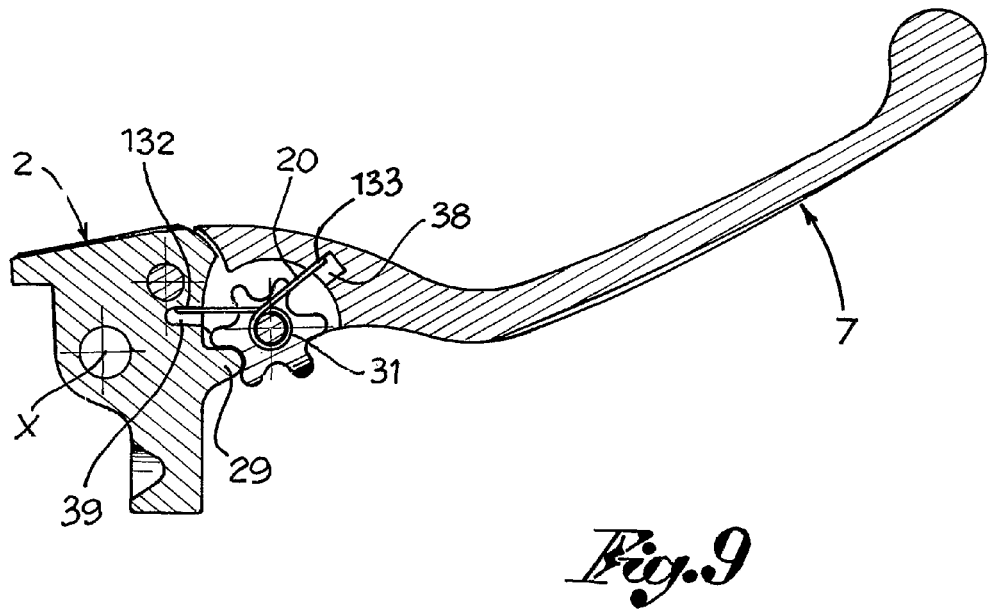
FIG. 9 shows a section view of an alternative embodiment of the device of FIG. 1.

According to a further alternative embodiment, the elastic means 120 comprise, as said, the first end 132 (FIGS. 9, 11).

Preferably, the first end 132 is inserted in a holding seat 39 and interferes with the walls of said holding seat 39 during the angular adjustment stroke C, for example moving in abutment on one of the side surfaces thereof (FIGS. 9 and 11).

Moreover, the elastic means 120 exhibit a second end 133 suitable for engaging into the corresponding holding recess 38 obtained into seat 22 and which interferes with the walls of said holding recess 38, during the angular adjustment stroke C.

The second end 133 is associated to the thrust lever 7, whereas the first end 132 is pre-loaded so as to allow the return to the angular rest position R when the second operating means 7 impart the adjustment movement along the angular adjustment stroke C, that is, so as to carry out the function of returning the gripping lever 7 to the rest position R.

According to the present invention, the elastic means 120 preferably comprise a helical spring, that is, a torsion spring, having the first end 133 that engages in a portion of seat 22 and the second end 132 that engages in a portion of the thrust lever 2, jointed by the annular central portion 31 suitable for being inserted into said first pin 10.

In accordance with a further embodiment of the present invention, the thrust lever 2 exhibits a portion 15, that is, a travel end, suitable for abutting against a corresponding portion of the gripping lever 7.

Favourably, portion 15 is comprised in the recessed region 36, so that the tines 17 are housed in the same recessed region 36 and therefore that at least one of tines 17 meets portion 15 at the end of the angular adjustment stroke C.

Thus, the gripping lever 7 has tines 17 inserted in the recessed region 36 of the thrust lever 2 and is pivoted to the thrust lever 2 itself: the rotation of the gripping lever 17 is thus limited by the travel end portion 15.

In fact, when the gripping lever 7 is rotated along the angular adjustment stroke C, at least one of its tines 17 moves in abutment against portion 15, thus limiting the width of the adjustment stroke C itself.

Favourably, a recessed region 36 is obtained on each of the two opposite faces of the thrust lever 2 and each of them comprises a travel end portion 15, so that both tines 17 have an angular adjustment stroke C limited by portions 15 themselves.

In this way, the elastic means 20, 120 are subject to an elastic stress limited by the presence of the travel end portion 15, during the adjustment stroke C, so that no yield or non-elastic deformation of the elastic means 20, 120 themselves occurs, for example due to an excessive rotation of the gripping lever 7 itself, along the adjustment stroke C (see FIGS. 1, 1a, 8, 8a, 9).

Therefore, device 1 in accordance with the present invention advantageously allows minimising the excessive overall dimensions of the adjustment means of the rest position R of the gripping lever, in the transversal direction relative to the gripping lever itself.

Advantageously, in fact, the cam portion that receives the twisting torque from the user is integrated with the cam portion that contributes to the coupling with the thrust lever 2, thus allowing considerable reduction of the axial overall dimensions, that is, transversally relative to the main direction of development of the gripping lever 7, of the system for adjusting the position of the gripping lever 7 relative to handlebar 35.

According to a further advantageous aspect thereof, in the only surface or side skirt 12 there are integrated two surfaces, that is, the coupling surface, or the cam seats, and the thrust surface for the adjustment rotation, or the cam tips, thus allowing considerable and advantageous reduction of the axial overall dimensions of the adjustment device, with evident economical and aesthetic advantages.

In this way, moreover, the cam is very advantageously hidden and protected from accidental shocks, or from items raised during the drive such as stones and mud, in a recess defined by the handle or grip of the handlebar and by the thrust lever and gripping lever together, even though it is at the same time advantageously accessible in quick and effective manner by the user wishing to adjust the cam position, the cam itself in fact facing the motorcyclist, that is, the direction opposed the driving direction.

In fact, since such adjustment devices are normally arranged in the outermost and most exposed portion of the motorcycle, during a fall, one of its particularly protruding portions may abruptly collide with the ground, thus causing the breakage or deformation of the adjustment device or of its handlebar support and fixing structure.

Such damages could imply serious consequences for the motorcyclist's safety, for example preventing an effective braking action.

Advantageously, however, the device according to the present invention is carefully protected by the gripping lever, while remaining easily accessible by the user for adjustments.

Advantageously, moreover, the resistance of the brake fluid which is compressed while braking, or the counter-pressure exerted on the transmission portion 8, is evenly discharged on the thrust lever 2, for example partly on eyebolt 19 and not directly on the rotating cam 9, since the coupling counter-means 29 are a portion of said thrust lever 2 which is different from said transmission portion 8, that is, the directrix along which the thrust of the gripping lever 7 acts on the thrust lever 2 differs from the directrix along which the actuation of the transmission portion 8 acts on the cylinder-piston unit; in this way, the rotating cam 9 and the first pin 10 are prevented from harmful thrusts, which tend to tilt or in any case stress the first pin 10 relative to the expected operating position.

According to a further advantageous aspect thereof, moreover, the thrust lever 2 is integrally formed with the coupling counter-means 29, thus allowing considerable advantage during the assembly of the adjustment device 1.

Advantageously, moreover, the elastic means 20, 120 or the spring that allows the gripping lever to automatically return to the rest position R after it has been stressed for adjustment, are directly associated to the cam during assembly, thus allowing considerable reduction of the difficulties connected to the assembly of this return system.

In fact, the provision of cam and thus rotation pin 10 not directly stressed by transmission portions of the actuation movement of the gripping lever to the cylinder-piston unit, advantageously allows the use of elastic means, such as a traction, helical or torsion spring, directly associated to the first rotation pin 10.

The invention claimed is:

1. An adjustment device for motorcycle master cylinders, said device comprising
first operating means pivotally associable to a cylinder-piston unit of a motorcycle master cylinder, so as to impart an actuation movement to said cylinder-piston unit, said first operating means comprising coupling counter-means;
second operating means pivotally connected to said first operating means and suitable for imparting a thrust movement to said first operating means for carrying out said actuation means of said first operating means, said second operating means further comprising a first end, two side surfaces protruding from said first end and arranged in position substantially parallel to one another, said two side surfaces delimiting a seat recessed between said two side surfaces; said device further comprising
adjustment means, arranged between said first operating means and said second operating means, said adjustment means being coupled with said second operating means and being pivotally housed into said seat, said adjustment means further being suitable for adjusting the relative angular position between said second operating means and said first operating means, said adjustment means further having a side skirt comprising coupling means suitable for geometrically and selectively coupling with said coupling counter-means of said first operating means for defining at least one angular rest position between said first operating means and said second operating means for imparting said thrust movement from said second operating means to said first operating means, operating portions comprising thrust surfaces accessible by an operator for a rotation of said adjustment means, said rotation being suitable for selecting the coupling between one of said coupling means and said coupling counter-means; and wherein, moreover, said coupling means and said operating portions are comprised between planes defined by said side surfaces of said seat
wherein said adjustment means have a rotation hole and a first rotation pin, axially housed in said hole and cooperating with said first end, for holding said adjustment means in said seat and for allowing rotation of said adjustment means about said first pin, when said coupling means are uncoupled from said coupling counter-means and
said thrust movement of said second operating means to said first operating means is actuated along an angular actuation stroke and said second operating means are also actuable along an angular adjustment stroke, opposed to said angular actuation stroke, for releasing said coupling means from said coupling counter-means and allowing rotation of said adjustment means, and further comprising
elastic means substantially housed into said seat and axially associated with said adjustment means by said first pin, said elastic means biasing said second operating means toward said angular rest position when said second operating means are actuated along said angular adjustment stroke.

2. A device according to claim 1, wherein said adjustment means comprise a rotating cam which comprises said coupling means comprising coupling seats, said operating portions comprising operating tips, and wherein, moreover, each of said coupling seats is comprised between two respective operating tips.

3. A device according to claim 2, wherein said coupling seats are each obtained at a different distance from the axis of rotation of said adjustment means, for predefining the angular position at will between said gripping lever and said thrust lever, when said coupling means are coupled with said coupling counter-means.

4. A device according to claim 1, wherein said first operating means comprise a thrust lever and said second operating means comprise a gripping lever.

5. A device according to claim 1, wherein said first end is provided with a first hole suitable for receiving said first pin and for cooperating with said first rotation pin for pivotally keeping said adjustment means into said seat.

6. A device according to claim 1, wherein said first operating means has a recessed region and said second operating means carry two tines respectively extending as an extension of said two side surfaces and with a shape substantially conforming to said recessed region of said first operating means, for obtaining the connection between said first operating means and said second operating means.

7. A device according to claim 6, comprising a second pin suitable for pivoting said tines onto said recessed region, for obtaining said pivotal connection between said first operating means and said second operating means which allows said angular actuation stroke and said angular adjustment stroke.

8. A device according to claim 7, wherein said second pin has a first end and a retaining head of dimensions suitable for interfering with the outer surface of one of said tines.

9. A device according to claim 7, comprising stopping means suitable for axially locking said second pin when it is inserted into said second holes and into said counter-holes.

10. A device according to claim 9, wherein said stopping means comprise a snap ring suitable for cooperating with an annular groove provided at a second end of said second pin.

11. A device according to claim 1, wherein said elastic means comprise a portion suitable for engaging with said first pin and a first end suitable for engaging with said first operating means.

12. A device according to claim 11, wherein said first end is suitable for engaging with a portion of said first operating means.

13. A device according to claim 11, wherein said first end is inserted in a holding seat of said first operating means and interferes with the walls of said holding seat during the angular adjustment stroke.

14. A device according to claim 11, wherein said first end is elastically pre-loaded so as to carry out a function of return for said second operating means for allowing said return to said angular rest position when said second operating means are actuated along said angular adjustment stroke.

15. A device according to claim 1, wherein said elastic means comprises a second end suitable for engaging with a holding recess obtained in said seat for interfering with the walls of said holding recess, at least during said angular adjustment stroke.

16. A device according to claim 15, wherein said second end is associated to said first operating means, thus allowing said first end to carry out said return of said second operating means to said angular rest position.

17. A device according to claim 1, wherein said elastic means comprises a torsion spring.

18. A device according to claim 1, wherein said elastic means comprise a spring body substantially cylindrical and suitable for being associated to said first operating means.

19. A device according to claim 18, wherein said spring body comprises said first end for coupling to said first operating means.

20. A device according to claim 18, wherein said first operating means comprise a housing suitable for housing said elastic means.

21. A device according to claim 20, wherein said housing is provided with a special portion suitable for being coupled to said first end, for carrying out the return of said second operating means.

* * * * *